(12) United States Patent
Azizi et al.

(10) Patent No.: US 9,806,927 B2
(45) Date of Patent: Oct. 31, 2017

(54) METHOD, APPARATUS, AND COMPUTER READABLE MEDIUM FOR SIGNALING HIGH EFFICIENCY PACKET FORMATS USING A LEGACY PORTION OF THE PREAMBLE IN WIRELESS LOCAL-AREA NETWORKS

(71) Applicant: Intel IP Corporation, Santa Clara, CA (US)

(72) Inventors: Shahrnaz Azizi, Cupertino, CA (US); Robert J. Stacey, Portland, OR (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 10 days.

(21) Appl. No.: 14/751,089

(22) Filed: Jun. 25, 2015

(65) Prior Publication Data
US 2016/0212247 A1 Jul. 21, 2016

Related U.S. Application Data

(60) Provisional application No. 62/105,822, filed on Jan. 21, 2015, provisional application No. 62/106,039, filed on Jan. 21, 2015.

(51) Int. Cl.
*H04L 29/08* (2006.01)
*H04W 80/04* (2009.01)
(Continued)

(52) U.S. Cl.
CPC ................ *H04L 27/2613* (2013.01)

(58) Field of Classification Search
CPC ..... H04W 16/10; H04W 28/06; H04W 72/00; H04W 72/04; H04W 80/04;
(Continued)

(56) References Cited

U.S. PATENT DOCUMENTS

2011/0299468 A1 12/2011 Van Nee et al.
2012/0327871 A1 12/2012 Ghosh et al.
(Continued)

FOREIGN PATENT DOCUMENTS

CN 107005526 A 8/2017
DE 102015120622 A1 7/2016
(Continued)

OTHER PUBLICATIONS

"U.S. Appl. No. 14/747,191, Non Final Office Action mailed Oct. 20, 2016", 27 pgs.
(Continued)

*Primary Examiner* — Tri H Phan
(74) *Attorney, Agent, or Firm* — Schwegman Lundberg & Woessner, P.A.

(57) ABSTRACT

Methods, apparatuses, and computer readable media for signaling high-efficiency packet formats using a legacy portion of the preamble in wireless local-area networks are disclosed. A high-efficiency (HE) wireless local area network (HEW) device including circuitry is disclosed. The circuitry may be configured to generate a HE packet comprising a legacy signal field (L-SIG) followed by one or more HE signal fields, and configure the L-SIG to signal to a second HEW device either a first packet format of the HE packet or a second packet format of the HE packet, where a length of the L-SIG modulo 3 is used to signal the first packet format or the second packet format. The circuitry may be configured to generate a duplicated L-SIG field with a polarity difference to indicate a third packet configuration of the HE packet or a fourth packet configuration of the HE packet.

23 Claims, 12 Drawing Sheets

(51) Int. Cl.
*H04W 84/12* (2009.01)
*H04L 27/26* (2006.01)

(58) Field of Classification Search
CPC ...... H04W 80/045; H04W 84/12; H04L 1/00; H04L 1/06; H04L 27/26; H04L 27/2613; H04L 29/08; H04L 69/324
See application file for complete search history.

(56) References Cited

U.S. PATENT DOCUMENTS

| | | |
|---|---|---|
| 2013/0176980 A1 | 7/2013 | Kneckt et al. |
| 2014/0211775 A1 | 7/2014 | Sampath et al. |
| 2014/0307650 A1 | 10/2014 | Vermani et al. |
| 2014/0369276 A1 | 12/2014 | Porat et al. |
| 2015/0009894 A1* | 1/2015 | Vermani ............... H04L 1/0072 370/328 |
| 2015/0023335 A1 | 1/2015 | Vermani et al. |
| 2015/0063255 A1* | 3/2015 | Tandra ................. H04J 11/0023 370/329 |
| 2015/0139205 A1* | 5/2015 | Kenney ............... H04W 52/241 370/338 |
| 2016/0044635 A1* | 2/2016 | Seok ..................... H04L 69/324 370/312 |
| 2016/0065467 A1 | 3/2016 | Wu et al. |
| 2016/0105535 A1* | 4/2016 | Kenney .................... H04L 5/00 370/329 |
| 2016/0112899 A1* | 4/2016 | Kenney ............... H04W 52/241 370/338 |
| 2016/0119453 A1* | 4/2016 | Tian .......................... H04L 5/04 370/338 |
| 2016/0127948 A1* | 5/2016 | Azizi .................... H04W 28/18 370/338 |
| 2016/0127992 A1* | 5/2016 | Kenney ............. H04W 52/0212 370/311 |
| 2016/0135086 A1* | 5/2016 | Yang .................... H04L 1/0011 370/343 |
| 2016/0165588 A1* | 6/2016 | Ghosh .................. H04L 5/0007 370/392 |
| 2016/0174200 A1* | 6/2016 | Seok ..................... H04W 72/04 370/329 |
| 2016/0212001 A1* | 7/2016 | Azizi .................. H04L 27/2613 |
| 2016/0234779 A1* | 8/2016 | Kenney ................. H04W 4/008 |
| 2016/0249381 A1 | 8/2016 | Choi et al. |

FOREIGN PATENT DOCUMENTS

| | | |
|---|---|---|
| DE | 102015120814 A1 | 7/2016 |
| KR | 1020130071396 A | 6/2013 |
| WO | WO-2014182065 A | 11/2014 |
| WO | WO-2014209425 A1 | 12/2014 |
| WO | WO-2016118237 A1 | 7/2016 |
| WO | WO-2016118242 A1 | 7/2016 |

OTHER PUBLICATIONS

"U.S. Appl. No. 14/747,191, Response filed Feb. 8, 2017 to Non Final Office Action mailed Oct. 20, 2016", 10 pgs.
"International Application Serial No. PCT/US2015/063113, International Search Report mailed Mar. 9, 2016", 3 pgs.
"International Application Serial No. PCT/US2015/063113, Written Opinion mailed Mar. 9, 2016", 5 pgs.
"International Application Serial No. PCT/US2015/064794, International Search Report mailed May 30, 2016", 5 pgs.
"International Application Serial No. PCT/US2015/064794, Written Opinion mailed May 30, 2016", 10 pgs.
"U.S. Appl. No. 14/747,191, Final Office Action dated May 25, 2017", 23 pgs.
"U.S. Appl. No. 14/747,191, Response dated Jul. 25, 2017 to Final Office Action dated May 25, 2017", 9 pgs.
"Brazilian Application Serial No. BR102015032049-3, Voluntary Amendment dated Jun. 27, 2017", (W/ English Claims), 16 pgs.
"International Application Serial No. PCT/US2015/063113, International Preliminary Report on Patentability dated Aug. 3, 2017", 7 pgs.
"International Application Serial No. PCT/US2015/064794, International Preliminary Report on Patentability dated Aug. 3, 2017", 10 pgs.
"U.S. Appl. No. 14/747,191, Notice of Allowance dated Aug. 14, 2017", 11 pgs.

* cited by examiner

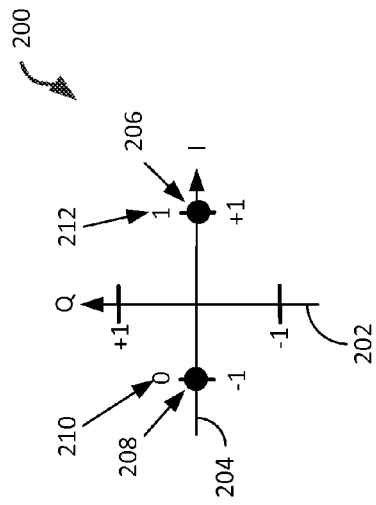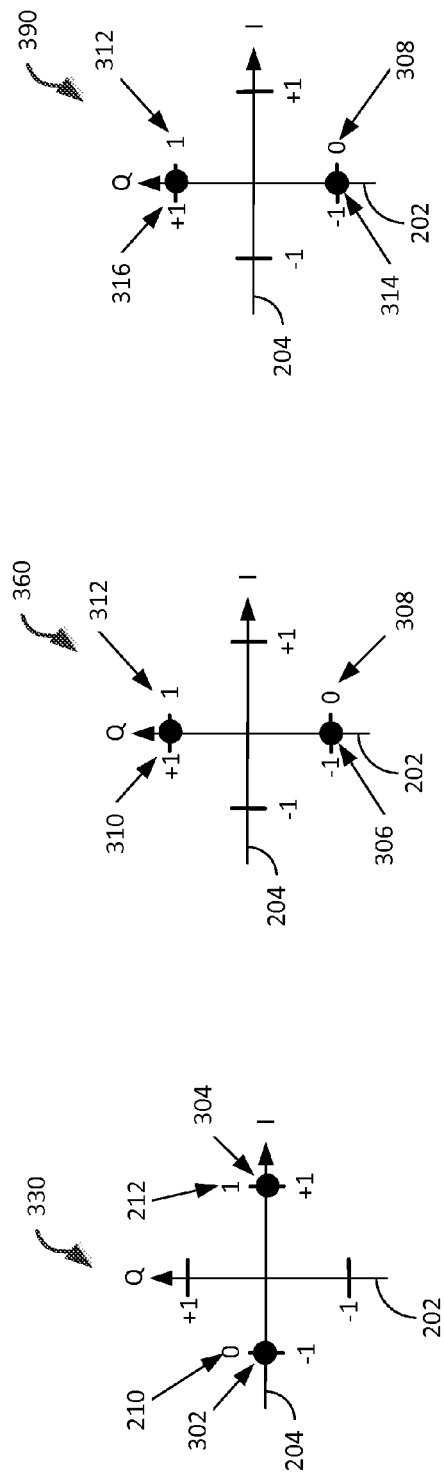

| | SU FORMAT 1002 | MU FORMAT 1004 | |
|---|---|---|---|
| | BW 2 BITS | | |
| | BSS COLOR 6 BITS | | |
| | NSTS -- 3 BITS | NSYM FOR HE-SIG-B (INDICATES 1 TO 9 SYMBOLS) -- 3 BITS | } 1008 |
| | MCS -- 4 BITS | MCS FOR HE-SIG-B -- 2 BITS | LDPC |
| | | -- | STBC |
| | CODING -- 1 BIT | -- | BCC |
| | GI FOR DATA -- 1 BIT | -- | |
| | BEAMFORMED -- 1 BIT | | |
| | | | } 1006 CCA MARGIN/ DENSIFICATION 3 BITS |
| | CRC 4 BITS | | LENGTH AMBIGUITY |
| | TAIL 6 BITS | | |
| TOTAL | 26 BITS | 23 BITS | |

FIG. 10

METHOD, APPARATUS, AND COMPUTER READABLE MEDIUM FOR SIGNALING HIGH EFFICIENCY PACKET FORMATS USING A LEGACY PORTION OF THE PREAMBLE IN WIRELESS LOCAL-AREA NETWORKS

PRIORITY CLAIM

This application claims the benefit of priority under 35 USC 119(e) to U.S. Provisional Patent Application Ser. No. 62/106,039, filed Jan. 21, 2015, and U.S. Provisional Patent Application Ser. No. 62/105,822, filed Jan. 21, 2015, which are incorporated herein by reference in their entirety.

TECHNICAL FIELD

Some embodiments relate to transmitting and receiving preambles in wireless local area networks (WLANs) including networks operating in accordance with the Institute of Electronic and Electrical Engineers (IEEE) 802.11 family of standards. Some embodiments relate to signaling formats of high-efficiency (HE) WLANs (HEW) packets in a legacy preamble. Some embodiments relate to using a modulation and coding scheme (MCS) field of a HEW signal field to jointly signal MCS and low-density parity check (LDPC) and/or a MCS and space-time block coding (STBC).

BACKGROUND

One issue with communicating data over a wireless network is transmitting and receiving packets that may include preamble fields. Another issue with communicating data over a wireless network is that often more than one standard may be in use in a WLAN. For example, IEEE 802.11ax, which may be referred to as HEW or HE may need to be used with legacy versions of IEEE 802.11.

Thus there are general needs for systems and methods that allow for signaling high-efficiency packet formats using a legacy portion of the preamble of the packet.

BRIEF DESCRIPTION OF THE DRAWINGS

The present disclosure is illustrated by way of example and not limitation in the figures of the accompanying drawings, in which like references indicate similar elements and in which:

FIG. 2 illustrates a signal constellation that may be used in a signal field to indicate that packets that follow may be for 802.11a, in accordance with some embodiments;

FIG. 3 illustrates a series of signal constellations that may be used in a signal field to indicate that packets that follow may be for 802.11n, in accordance with some embodiments;

FIGS. 10 and 11 illustrate tables of the HE-SIG-A format in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
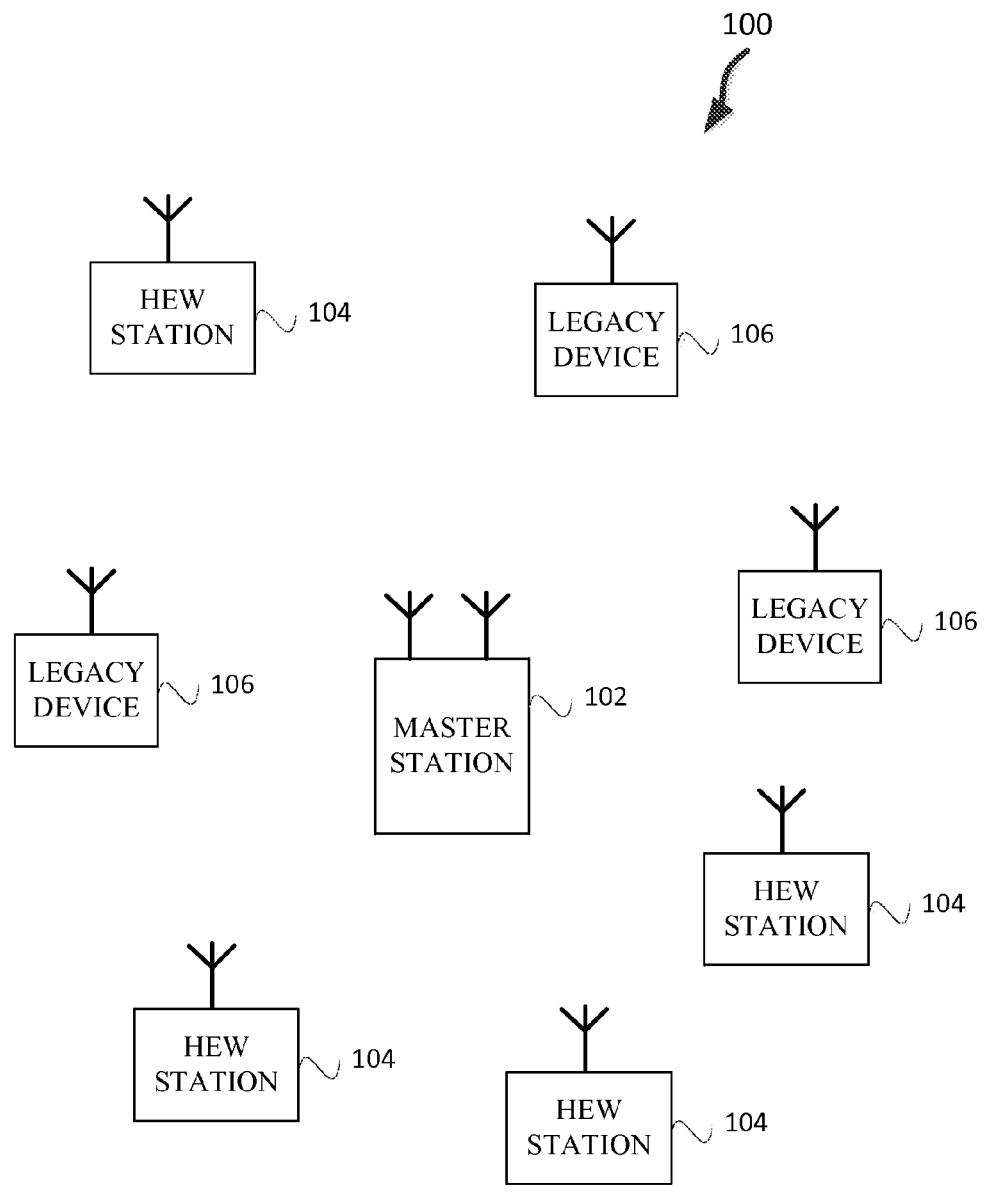
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW device 104 are configured to perform one or more of the functions and/or methods described herein in conjunction with FIGS. 1-12 such as, for example, generating an L-SIG to indicate a HE packet format or configuration or detecting that an L-SIG indicates an HE packet format or configuration. Additionally, the master station 102 and/or HEW device 104 may be configured to encode additional format or configuration information in the MCS field and/or using tail bits.

FIG. 2 illustrates a signal constellation 200 that may be used in a signal field to indicate that packets that follow may be for 802.11a, in accordance with some embodiments. The horizontal axis may be an in-phase (I) 204 portion of a received signal field, and the vertical axis may be a quadrature portion (Q) 202 portion of the received signal field. The amplitude and phase shift of the received signal field encode information. The dots 206, 208 indicate received amplitude and phase combinations of symbols 0 210 and 1 212, respectively. The power can be measured along the I axis 204 and along the Q axis 202. A greater power along the I axis 204 may indicate that the signal field is for 802.11a.

HEW devices 104 may use the signal constellation 200 to determine the I 204 and Q 202 axes. HEW devices 104 may use the signal constellation 200 to determine that a packet is an 802.11a packet and defer use of the wireless medium based on a length and duration in the 802.11a packet. HEW devices 104 may determine to use the 802.11a standard based on receiving the signal constellation 200.

FIG. 3 illustrates a series 300 of signal constellations 330, 360, 390 that may be used in a signal field to indicate that packets that follow may be for 802.11n, in accordance with some embodiments. The signal constellations 330, 360, 390 may be similar to the signal constellation in FIG. 2. In the first signal constellation 330, the dots 302, 304 are along the I axis 204. In the second signal constellation 360, the dots 306, 310 indicate received amplitude and phase combinations of symbols 0 308, and 1 312, respectively. The dots 306, 310 are along the vertical axis 202. In the third signal constellation 390, the dots 314, 316 indicate received amplitude and phase combinations of symbols 0 308, and 1 312. The dots 314, 316 are along the vertical axis 202. The power can be measured along the I axes 204 and along the Q axes 202. The first constellation 330 may be used to determine the I axis 204 and the Q axis 202. A greater power on the Q axis 202 for the second constellation 360, and a greater power on the Q axis 202 for the third constellation 390, may indicate that the signal fields may be for 802.11n. The first constellation 330 may be a signal field. The second and third constellations 360, 390 may be high-throughput (HT) signal fields.

Legacy devices 106 that operate in accordance with 802.11a may not be able to interpret the signal constellation 360 since it is rotated. The first constellation 330 may be a signal field that includes a length field and a rate. The legacy devices 106 then defer for the entire time indicated by the length and the rate. The legacy devices 106 that operate in accordance with 802.11n can then set the length and rate fields of the first constellation 330 for the entire duration of the 802.11 transmission. In this way, the legacy devices 106 that operate in accordance with 802.11n can recognize the second constellation 360 as an HT signal field and the third constellation 390 as an HT signal field and can defer legacy devices 106 operating in accordance with 802.11a.

HEW devices 104 may use the signal constellations 330, 360, and/or 390 to determine that a packet is an 802.11n packet and defer use of the wireless medium based on a duration and length in the 802.11n packet, although the scope of the embodiments is not limited in this respect. HEW devices 104 may determine to use the 802.11n standard based on receiving the signal constellations 330, 360, 390, although the scope of the embodiments is not limited in this respect.

Figure 4:
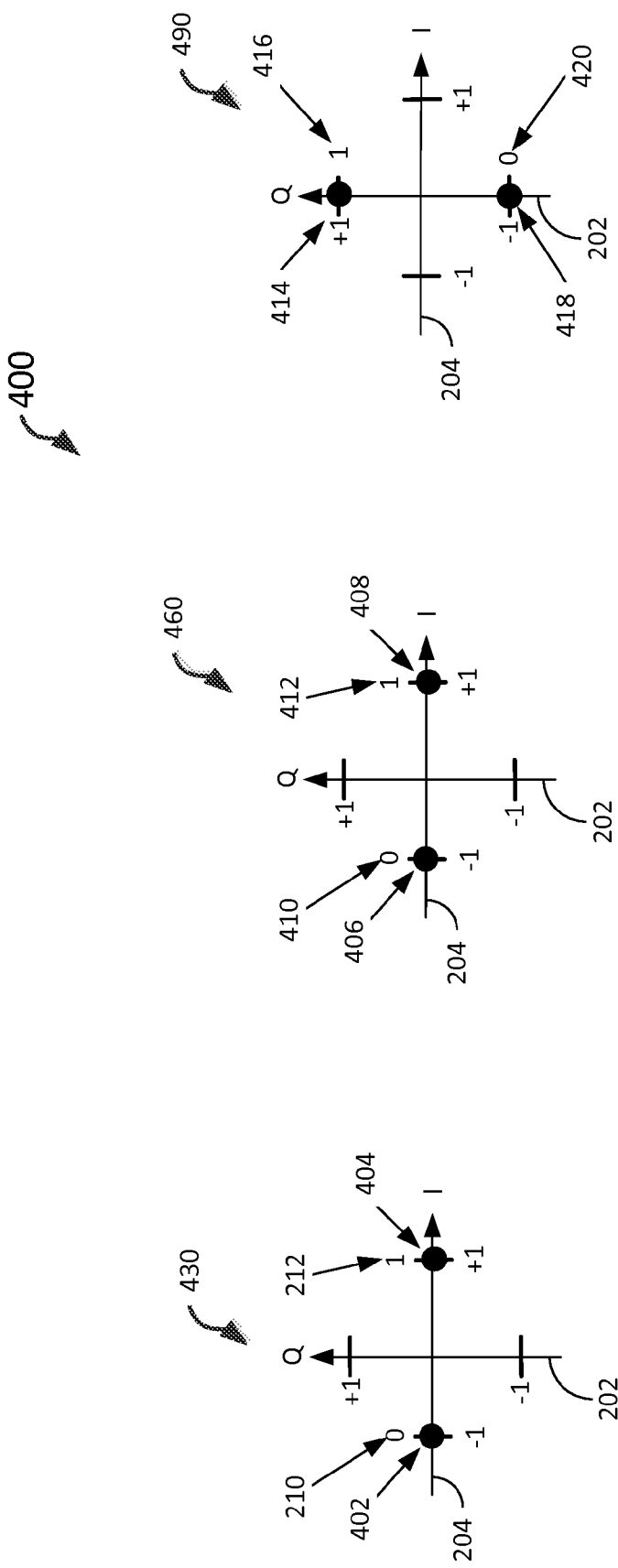
FIG. 4 illustrates a series of signal constellations that may be used in a signal field to indicate that packets that follow may be for 802.11ac, in accordance with some embodiments.

FIG. 4 illustrates a series 400 of signal constellations 430, 460, 490 that may be used in a signal field to indicate that packets that follow may be for 802.11ac, in accordance with some embodiments. The signal constellations 430, 460, 490 may be similar to the signal constellation in FIG. 2. In the first signal constellation 430, the dots 402, 404 are along the I axis 204. In the second signal constellation 460, the dots 406, 408 indicate received amplitude and phase combinations of symbols 0 410 and 1 412, respectively, and the dots 406, 408 are along the I axis 204. In the third signal constellation 490, the dots 418, 414 indicate received amplitude and phase combinations of symbols 0 420 and 1 416, respectively, and the dots 414, 416 are along the Q axis 202. The power can be measured along the I axes 204 and along the Q axes 202. The first constellation 430 may be used to determine the I axis 204 and the Q axis 202. A greater power on the I axis 202 for the second constellation 460, and a greater power on the Q axis 202 for the third constellation 490 may indicate that the signal fields may be for 802.11ac. The first constellation 430 may be a signal field. The second and third constellations 460, 490 may be very high-throughput (VHT) signal fields, which may be termed SIG-A and SIG-B.

Legacy devices 106 that operate in accordance with 802.11a may not be able to interpret the signal constellation 490 since it is rotated. The first constellation 430 may be a signal field that includes a length field and a rate. The legacy devices 106 that operate in accordance with 802.11a will defer for the entire time indicated by the length and rate in the first constellation 430. The legacy devices 106 that operate in accordance with 802.11n will recognize that the second constellation 460 is not rotated so it is not a signal field for 802.11n. The legacy devices 106 that operate in accordance with 802.11n will then defer for the entire time indicated by the length and rate in the first constellation 430.

The legacy devices 106 that operate in accordance with 802.11ac can then set the length and rate fields of the first constellation 430 for the entire duration of the 802.11ac transmission. In this way, the legacy devices 106 that operate in accordance with 802.11ac can recognize second constellation 460 as a VHT signal field and third constellation 490 as a VHT signal field, and can defer legacy devices 106 operating in accordance with 802.11a and 802.11n.

HEW devices 104 may use the signal constellations 430, 460, and/or 490 to determine that a packet is an 802.11ac packet and defer use of the wireless medium based on a duration and length in the 802.11ac packet, although the scope of the embodiments is not limited in this respect. HEW devices 104 may determine to use the 802.11ac standard based on receiving the signal constellations 430, 460, 490, although the scope of the embodiments is not limited in this respect.

Figure 5:
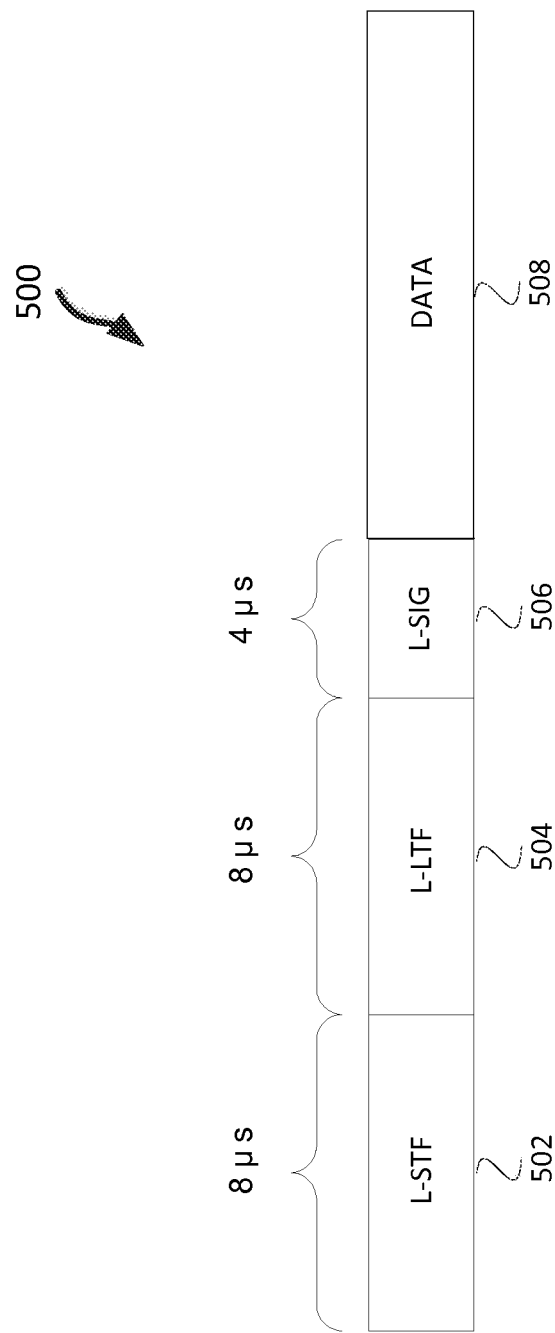
FIG. 5 illustrates an IEEE 802.11a/g packet in accordance with some embodiments.

FIG. 5 illustrates an IEEE 802.11a/g packet 500 in accordance with some embodiments. The IEEE 802.11a/g packet 500 may be a physical layer convergence procedure (PLCP) protocol data unit (PPDU). Illustrated in FIG. 5 are legacy short-training field (L-STF) 502, legacy long-training field (L-LTF) 504, legacy signal field (L-SIG) 506, and data 508. The L-STF 502 and L-LFT 504 may be a legacy fields to train the receiving legacy device 106, HEW device 104, and/or master station 102. The L-SIG 506 may be a legacy field that indicates that the communication protocol is IEEE 802.11a/g. The L-SIG 506 may indicate that the communication protocol is IEEE 802.11a/g as described in conjunction with FIGS. 2-4. The legacy devices 106, HEW stations 104, and/or master stations 102 may be configured to determine that packet 500 is an IEEE 802.11a/g format based on the L-STF 502, L-LTF 504, and L-SIG 506. The data 508 may be data that may include additional packet formats.

Figure 6A:
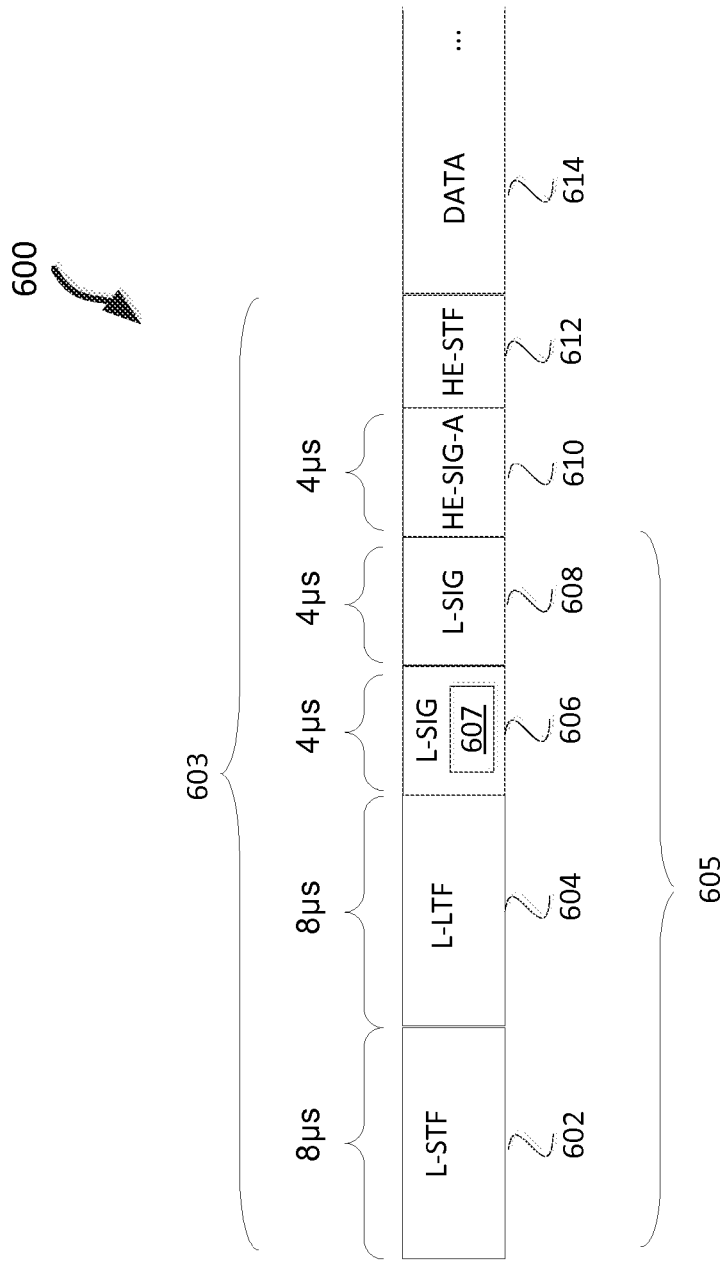
FIGS. 6A and 6B illustrate a HE packet with a single user (SU) preamble where a repeated L-SIG is used to indicate the communication protocol in accordance with some embodiments.
Figure 6B:
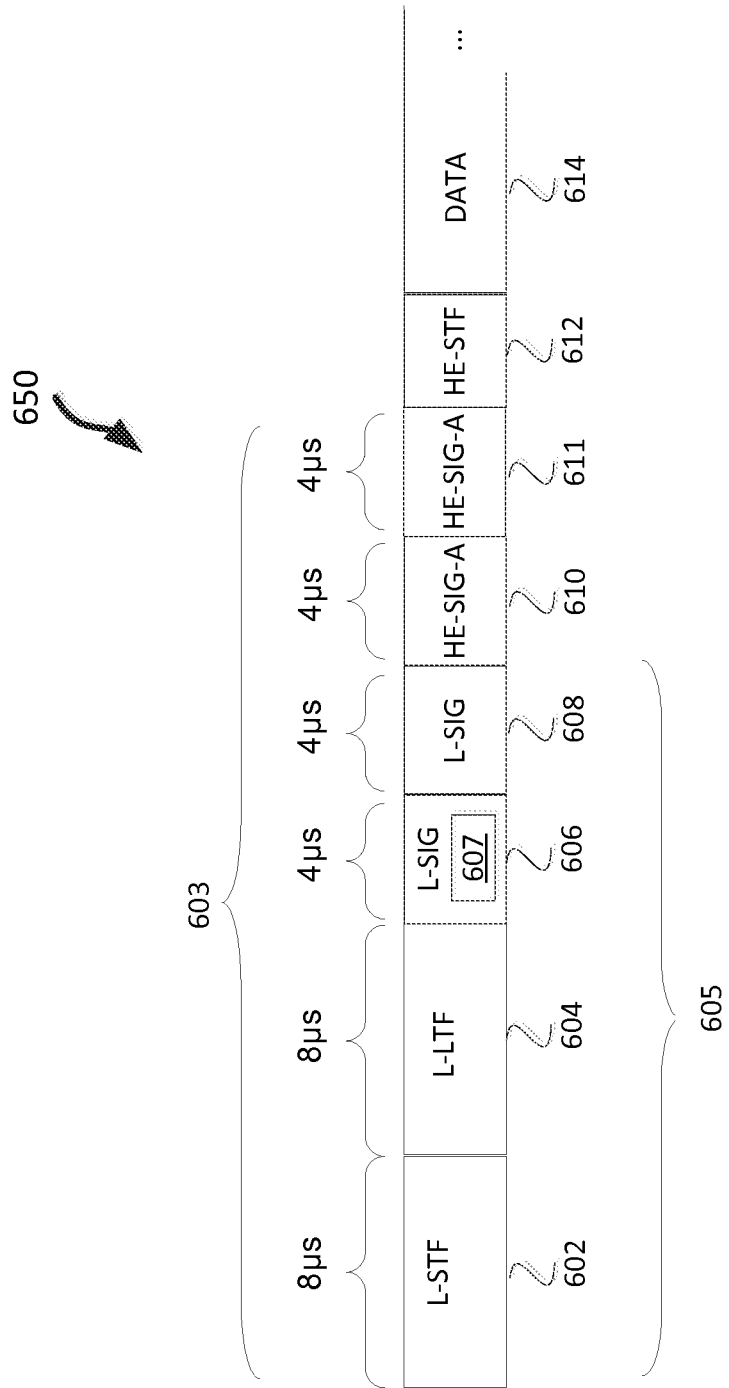

FIGS. 6A and 6B illustrate a HE packet 600, 650, respectively, with a single user (SU) preamble 603 where a repeated L-SIG is used to indicate the communication protocol in accordance with some embodiments. Illustrated in FIGS. 6A and 6B are L-STF 602, L-LTF 604, L-SIG 606, L-SIG 608, high-efficiency signal field A (HE-SIG-A) 610, a second HE-SIG-A 611 (FIG. 6B), high-efficiency short-training field (HE-STF) 612, and data 614. The HE packet 600, 650 communication protocol, which may be IEEE 802.11ax, may be indicated by two L-SIGs 606, 608. In some embodiments the communication protocol, which may be IEEE 802.11ax, may be indicated in a different way.

The HEW devices 104 and master stations 102 may be configured to determine that the packet is an HE packet 600, 650 based on the repeated L-SIGs 606, 608. In some embodiments, the HEW devices 104 and master stations 102 may be configured to determine that the packet is an HE packet 600, 650 based in a different way. The SU preamble 603 may include L-STF 602, L-LTF 604, L-SIG 606, L-SIG 608, HE-SIG-A 610, and HE-STF 612. The legacy portion 605 of the SU preamble 603 may be the L-STF 602, L-LTF 604, L-SIG 606, and L-SIG 608.

The HE-SIG-A 610 may be two symbols, in accordance with some embodiments. The HE-SIG-A 610 may include information that indicates a packet format common for both a SU preamble 603 and a MU preamble 703 (FIG. 7) for HE packets 600, 700 such as a BSS-color, a bandwidth (BW), a cyclic redundancy code (CRC), and tail bits. The HE-SIG-A 610 may also include information that indicates a modulation and coding scheme (MSC) for a HE-SIG-B that may be included in some HE packets 600, 650. In some embodiments, the HE-SIG-A 610 may include information that indicates a number of symbols of a HE-SIG-B and a guard interval used by the HE-SIG-B.

As illustrated in FIG. 6B, the HE-SIG-A 611 may be a second symbol of the HE-SIG-A 610. In some embodiments the HE-SIG-A 611 is a repeat of the HE-SIG-A 610. In some embodiments HE-SIG-A 611 is not included in the HE-packet 600, 650.

A HEW device 104 and/or master station 102 may be able to more quickly decode a packet 600, 650, 700 if the format of the packet is signaled in the legacy portion 605 of the preamble 603, 703. In some embodiments, the HE packet 600, 650 with a SU preamble may include a HE-SIG-G field.

Figure 7:
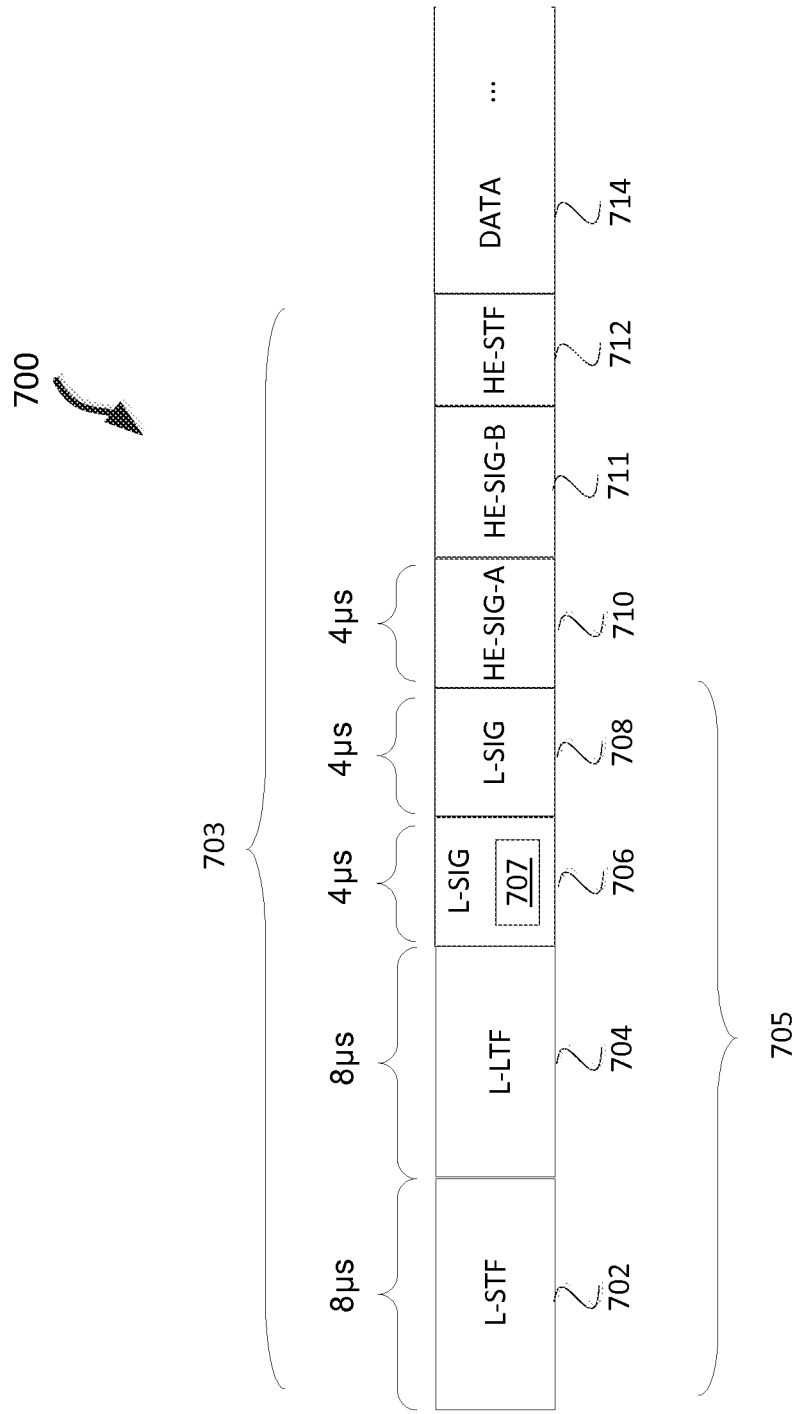
FIG. 7 illustrates a HE packet with a multi-user (MU) preamble 703 where a repeated L-SIG is used to indicate the communication protocol in accordance with some embodiments.

FIG. 7 illustrates a HE packet 700 with a multi-user (MU) preamble 703 where a repeated L-SIG is used to indicate the communication protocol in accordance with some embodiments. Illustrated in FIG. 7 are L-STF 702, L-LTF 704, L-SIG 706, L-SIG 708, HE-SIG-A 710, HE-SIG-B 711, HE-STF 712, and data 714. The HE packet 700 may be an IEEE 802.11ax. The HE packet 700 communication protocol, which may be IEEE 802.11ax, may be indicated by two L-SIGs 706, 708. In some embodiments the communication protocol, which may be IEEE 802.11ax, may be indicated in a different way. The HEW devices 104 and master stations 102 may be configured to determine that the packet is an HE packet 700 based on the repeated L-SIGs 706, 708. The MU preamble 703 may include L-STF 702, L-LTF 704, L-SIG 706, L-SIG 708, HE-SIG-A 710, HE-SIG-B 711, and HE-STF 712. The legacy portion 705 of the MU preamble 703 may be the L-STF 702, L-LTF 704, and L-SIG 706.

The HE-SIG-A 710 may be two symbols, in accordance with some embodiments. The HE-SIG-A 710 may include information that indicates a packet format common for both a SU preamble 603 (FIG. 6) and a MU preamble 703 for HE packets 600, 700 such as a BSS-color, a bandwidth (BW), a cyclic redundancy code (CRC), and tail bits. The HE-SIG-A 710 may also include information that indicates a modulation and coding scheme (MSC) for a HE-SIG-B that may be included in some HE packets 700. In some embodiments, the HE-SIG-A 710 may include information that indicates a number of symbols of the HE-SIG-B 711 and a guard interval used by the HE-SIG-B.

A HEW device 104 and/or master station 102 may be able to more quickly decode a packet 600, 700 if the format of the packet is signaled in the legacy portion 705 of the preamble 603, 703.

Referring to FIGS. 6 and 7, the legacy portion 605, 705 may indicate a packet format for the HE packet 600, 650, 700. For example, L-SIG 606, 706 may include a length 607, 707. The length of the L-SIG 606, 706 may need to be zero (mod 3) for legacy device 106, HEW devices 104, and master devices 102 to identify the communication protocol as IEEE 802.11ac. Legacy devices 106 will defer for whatever the length field in the L-SIG 606, 706 indicates. The length 607, 707 field may be used to signal a format of the HE packet 600, 650, 700. For example, length 607, 707 (mod 3)=1 may indicate that the HE packet 600, 650, 700 is a HE packet 600, 650, 700 for with a SU preamble 603, 703. Referring to FIG. 7, length 707 (mod 3)=2 may indicate that the HE packet 700 is a HE packet 700 with a MU preamble 703.

In some embodiments, the length 607, 707 field may be used to signal either an indoor or outdoor preamble format. The indoor or outdoor preamble format may indicate a guard interval for the HE-SIG-B 711. The indoor or outdoor preamble format may indicate a symbol size for a HE long-training field (HE-LTF).

In some embodiments, the legacy preamble 605, 705 may indicate two or more packet formats. For example, the length 607, 707 may be used to indicate whether the packet format is an SU format or a MU format, and a polarity of a repeated L-SIG 608, 708 may be used to indicate whether the packet format is an indoor format or an outdoor format. In some embodiments, different portions of the legacy preamble 605, 705 may be used to indicate different packet formats.

Figure 8:
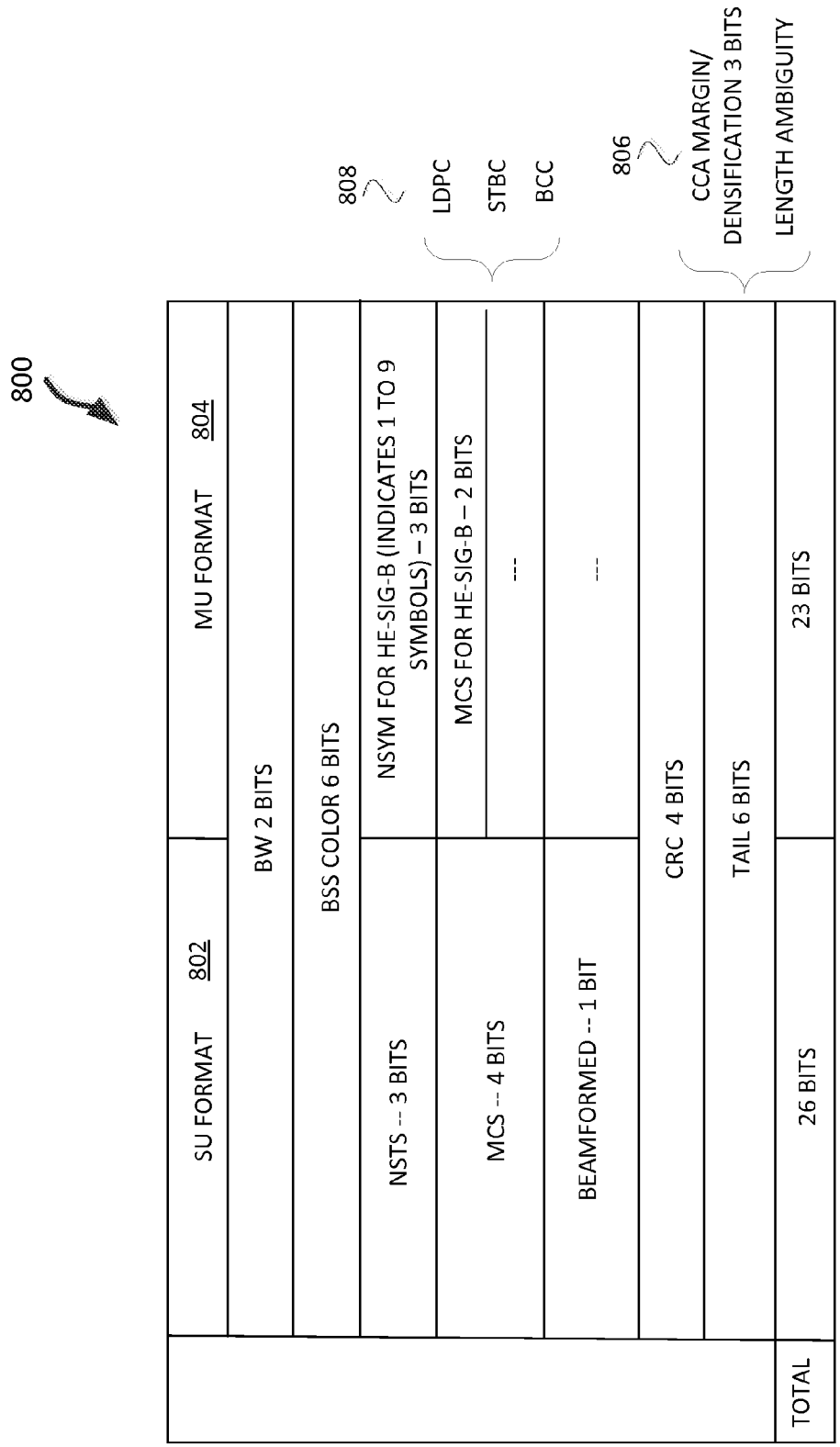
FIGS. 8 and 9 illustrate tables of the HE-SIG-A format in accordance with some embodiments.
Figure 9:
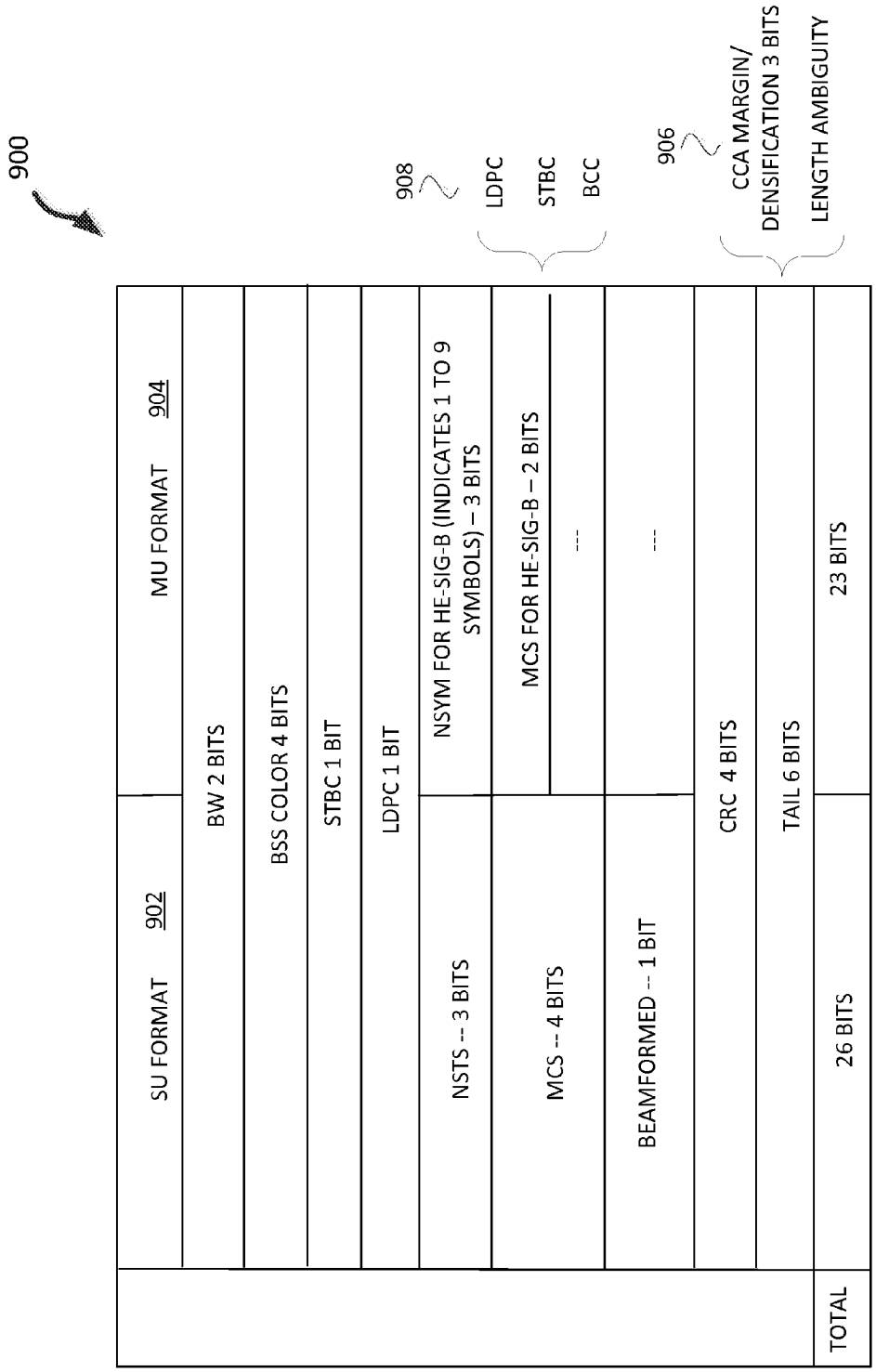

FIGS. 8 and 9 illustrate tables 800, 900, respectively, of the HE-SIG-A format in accordance with some embodiments. FIGS. 8 and 9 are described in conjunction with one another. In some embodiments the HE-SIG-A may have two formats either an SU format 802, 902 or an MU format 804, 904. In some embodiments, the format of the HE-SIG-A is signaled in the legacy preamble 605, 705. Both the SU format 802, 902 and the MU format 804, 904 may include a bandwidth (BW), BSS color, CRC, and tail. The BW may be two bits and may indicate a bandwidth. The BSS color may be four to six bits and may be an identifier of a BSS. Illustrated in FIG. 8 is BSS color with 6 bits and in FIG. 9 BSS with 4 bits.

Illustrated in FIG. 9 are two additional fields an indication of whether low-density parity-check (LDPC) is used and an indication of whether space-time block coding (STBC) is used in accordance with some embodiments. In some embodiments, two bits may be used to indicate a STBC configuration. In some embodiments the indication of whether LDPC is used also indicates whether or not binary convolution coding (BCC) is used.

The CRC may be four bits. The tail may be six bits and may be bits for unwinding the convolution code. The SU format 802, 902 may include number of spatial streams (NSTS), MCS, and beamformed. The NSTS, which may be three bits, may indicate a number of spatial streams. MCS, which may be four bits, may be an indication of the modulation and coding scheme (MCS) used to encode a remaining portion of the packet.

The MU format 804, 904 may include number of symbol (NSYM) for HE-SIG-B 711 and MCS for HE-SIG-B 711. NSYM may be three bits and may be a number of symbols of the HE-SIG-B 711. The MCS for HE-SIG-B may be two bits and may be an MCS for the HE-SIG-B 711. In some embodiments, the SU format 802, 902 may be 26 bits and the MU format 804, 904 may be 23 bits. An example of the number of bits that may be used for the fields of the SU format 802, 902 and MU format 804, 904 have been described, but a different number of bits may be used.

In example embodiments, tail biting may be used where some or all of the 6 bits of the tail are not included. The 6 bits may be used to signal one or more of LDPC or BCC coding, and/or an STBC configuration. As indicated at 806, 906 in some embodiments the 6 bits may be used to signal a clear channel assessment (CCA) margin/densification (3 bits) and/or length ambiguity.

Figure 11:
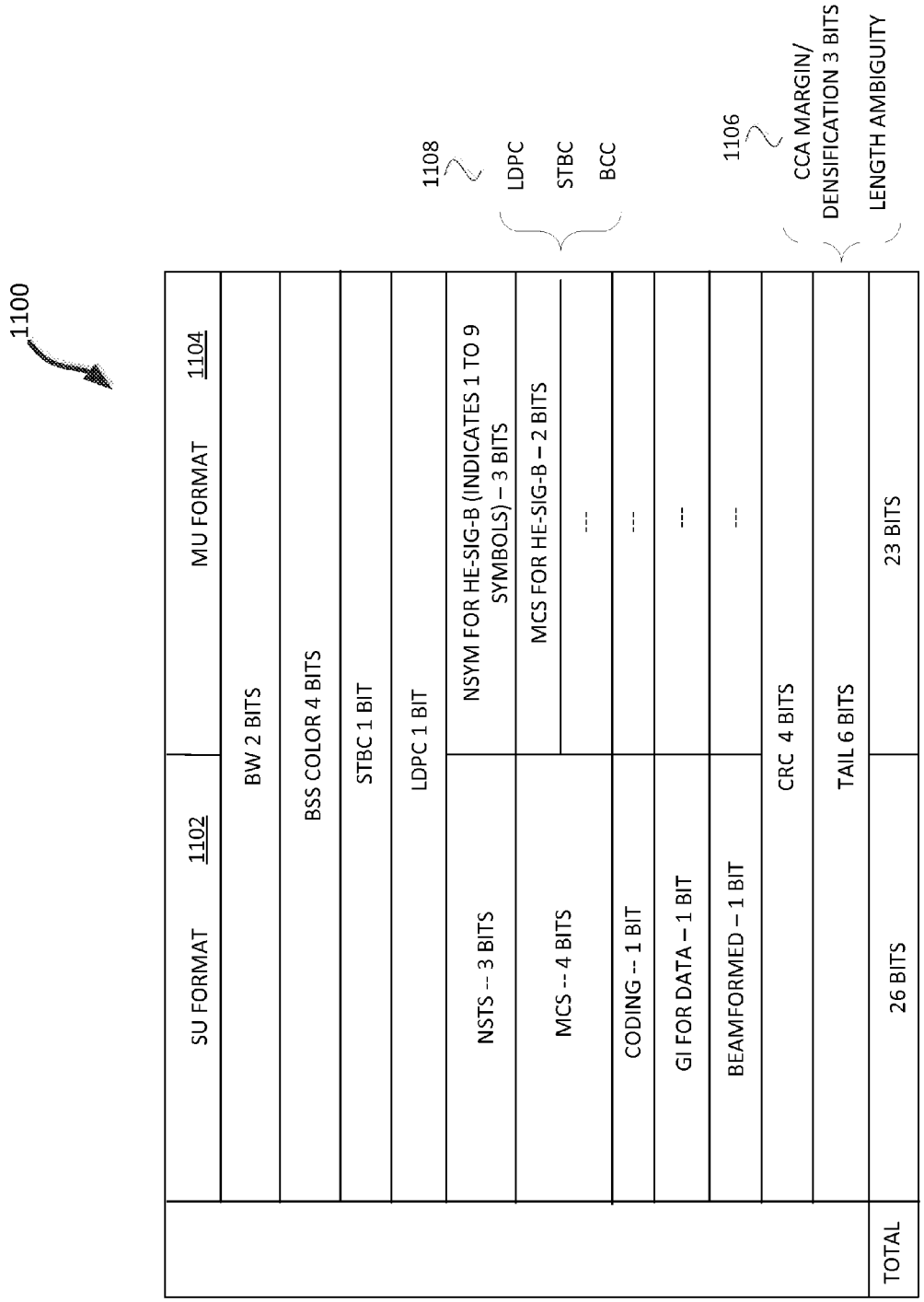

FIGS. 10 and 11 illustrate tables 1000, 1100, respectively, of the HE-SIG-A format in accordance with some embodiments. FIGS. 10 and 11 will be described together. In some embodiments the HE-SIG-A may have two formats either an SU format 1002, 1102 or an MU format 1004, 1104. In some embodiments, the format of the HE-SIG-A 610, 710 is signaled in the legacy preamble 605, 705. Both the SU format 1002, 1102 and the MU format 1004, 1104 may include a bandwidth (BW), BSS color, CRC, and tail. The BW may be two bits and may indicate a bandwidth. The BSS color may be six bits as illustrated in table 1000 or 4 bits as illustrated in table 1100 and may be an identifier of a BSS.

Illustrated in FIG. 11 are two additional fields an indication of whether low-density parity-check (LDPC) is used and an indication of whether space-time block coding (STBC) is used. In some embodiments, two bits may be used to indicate a STBC configuration. In some embodiments the indication of whether LDPC is used also indicates whether or not binary convolution coding (BCC) is used.

The CRC may be four bits. The SU format 1002, 1102 may include NSTS, MCS, coding, GI for data, and beam formed. The NSTS may be three bits and may indicate a number of spatial streams. MCS, which may be four bits, and may be an indication of the modulation and coding scheme (MCS) used to encode a remaining portion of the packet. Coding may be one bit and may indicate whether or not the remaining portion of the packet is coded. The GI for data may be one bit and may be an indication of a guard interval for the remaining portion of the packet such as the data. Beam formed, which may be one bit, may indicate whether or not beam forming is used for the packet.

The MU format 1004, 1104 may include NSYM for HE-SIG-B 711 and MCS for HE-SIG-B 711. NSYM may be three bits and may be a number of symbols of the HE-SIG-B 711. The MCS for HE-SIG-B 711 may be two bits and may be an MCS for the HE-SIG-B 711.

The tail may be six bits and may be bits for unwinding the convolution code. In example embodiments, tail biting may be used where some or all of the 6 bits of the tail are not included. The 6 bits may be used to signal one or more of LDPC or BCC coding, and/or an STBC configuration. As indicated at 1006, 1106 in some embodiments the 6 bits may be used to signal a clear channel assessment (CCA) margin/densification (3 bits) and/or length ambiguity.

Referring to FIGS. 8, 9, 10, and 11 at 808, 908, 1008, 1108, the MCS field may be used to signal one or more other fields. For example, to signal MCS may only require a value for MCS from zero to ten. This may leave five extra values in a four bit MCS field that are not utilized. These extra values or bits may be used to signal other fields. In example embodiments, a portion of the MCS field may be used where some or all of the four bits of the MCS are used to signal one or more of LDPC or BCC and/or an STBC configuration.

In example embodiments, if there are N values to use for signaling a joint MCS and STBC, then the specified MCS's to operate with STBC may be mapped to the MCS values. For example if we have five values that can be signaled, and then want to use MCS 0 through MCS 4 to be used with STBC, then MCS 0 with STBC would be signaled as MCS 11 in the HE-SIG-A 610, 710 MCS field. MCS 1 with STBC would be signaled as MCS 12, etc. In example embodiments values are chosen to improve performance, for example, instead of MCS 0-4, the values MCS 0, MCS 2, MCS 4, MCS 6 and MCS 10 could be used, which may improve performance by using different bits.

In some embodiments LDPC and MCS may jointed be signaled. In some embodiments a reduced MCS field with STBC and/or a reduced MCS field with LDPC could be jointly signaled using values of MCS that are not used to signal MCS values. For example, N values of MCS may be used to signal STBC, and 5-N may be used to signal LDPC. In some embodiments the MCS values of 11-15 may be used to jointly signal MCS and/or LDPC, and/or used to jointly signal the MCS and the STBC values.

In some embodiments, signaling a configuration in the legacy preamble 605, 705, before HE signaling, may convey the location of an HE-STF, existence of an HE-SIG-B and length of the guard interval for HE-SIG-B, and/or a symbol size of HE-LTFs. Thus, configurations could be used immediately after the L-SIG, and signaled using the L-SIG, so that the HEW station 104 and/or master station 102 would know the configurations after detecting the L-SIG.

In some embodiments, the SU format 802, 902, 1002, 1102 may be 26 bits and the MU format 804, 904, 1004, 1104 may be 23 bits. An example of the number of bits that may be used for the fields of the SU format 802, 902, 1002, 1102 and MU format 804, 904, 1004, 1104 has been described, but a different number of bits may be used. Moreover, the SU format 802, 902, 1002, 1102 and MU format 804, 904, 1004, 1104 may include fewer or more fields.

Figure 12:
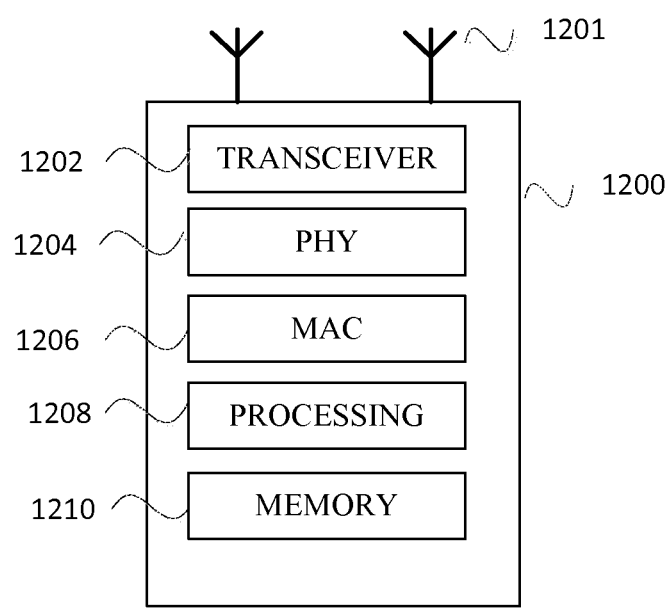
FIG. 12 illustrates a HEW device, in accordance with example embodiments.

FIG. 12 illustrates a HEW device in accordance with some embodiments. HEW device 1200 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1200 may be suitable for operating as master station 102 (FIG. 1) or a HEW STA 104 (FIG. 1). In accordance with embodiments, HEW device 1200 may include, among other things, a transmit/receive element 1201 (for example an antenna), a transceiver 1202, physical (PHY) circuitry 1204, and media access control (MAC) circuitry 1206. PHY circuitry 1204 and MAC circuitry 1206 may be HEW compliant layers and may also be compliant with one or more legacy IEEE 802.11 standards. MAC circuitry 1206 may be arranged to configure packets such as a physical layer convergence procedure (PLCP) protocol data unit (PPDUs) and arranged to transmit and receive PPDUs, among other things. HEW device 1200 may also include circuitry 1208 and memory 1210 configured to perform the various operations described herein. The circuitry 1208 may be coupled to the transceiver 1202, which may be coupled to the transmit/receive element 1201. While FIG. 12 depicts the circuitry 1208 and the transceiver 1202 as separate components, the circuitry 1208 and the transceiver 1202 may be integrated together in an electronic package or chip.

In some embodiments, the MAC circuitry 1206 may be arranged to contend for a wireless medium during a contention period to receive control of the medium for the HEW control period and configure an HEW PPDU. In some embodiments, the MAC circuitry 1206 may be arranged to contend for the wireless medium based on channel contention settings, a transmitting power level, and a CCA level.

The PHY circuitry 1204 may be arranged to transmit the HEW PPDU. The PHY circuitry 1204 may include circuitry for modulation/demodulation, upconversion/downconversion, filtering, amplification, etc. In some embodiments, the circuitry 1208 may include one or more processors. The circuitry 1208 may be configured to perform functions based on instructions being stored in a RAM or ROM, or based on special purpose circuitry. The circuitry 1208 may be termed processing circuitry in accordance with some embodiments. The circuitry 1208 may include a processor such as a general purpose processor or special purpose processor. The circuitry 1208 may implement one or more functions associated with transmit/receive elements 1201, the transceiver 1202, the PHY circuitry 1204, the MAC circuitry 1206, and/or the memory 1210.

In some embodiments, the circuitry 1208 may be configured to perform one or more of the functions and/or methods described herein and/or in conjunction with FIGS. 1-12 such as, for example, generating an L-SIG to indicate a HE packet format or configuration or detecting that an L-SIG indicates an HE packet format or configuration. Additionally, the master station 102 and/or HEW device 104 may be configured to encode additional format or configuration information in the MCS field and/or using tail bits.

In some embodiments, the transmit/receive elements 1201 may be two or more antennas that may be coupled to the PHY circuitry 1204 and arranged for sending and receiving signals including transmission of the HEW packets. The transceiver 1202 may transmit and receive data such as HEW PPDU and packets that include an indication that the HEW device 1200 should adapt the channel contention settings according to settings included in the packet. The memory 1210 may store information for configuring the other circuitry to perform operations for configuring and transmitting HEW packets and performing the various operations to perform one or more of the functions and/or methods described herein and/or in conjunction with FIGS. 1-12 such as, for example, generating an L-SIG to indicate a HE packet format or configuration or detecting that an L-SIG indicates an HE packet format or configuration. Additionally, the master station 102 and/or HEW device 104 may be configured to encode additional format or configuration information in the MCS field and/or using tail bits.

In some embodiments, the HEW device 1200 may be configured to communicate using OFDM communication signals over a multicarrier communication channel. In some embodiments, HEW device 1200 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1200 may use 4× symbol duration of 802.11n or 802.11ac.

In some embodiments, an HEW device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency (HE) wireless local area network (HEW) device, including circuitry configured to: generate a HE packet comprising a legacy signal field (L-SIG) followed by one or more HE signal fields; generate the L-SIG to signal to a second HEW device either a first packet format of the HE packet or a second packet format of the HE packet, wherein a length of the L-SIG modulo 3 is used to signal the first packet format or the second packet format; and transmit the HE packet to the second HEW device.

In Example 2, the subject matter of Example 1 can optionally include where the first packet format or the second packet format of the HE packet is at least one from the following group: a single user format or a multiple user format; and, an indoor format or an outdoor format.

In Example 3, the subject matter of Example 2 can optionally include where the circuitry is to configure a length field of the L-SIG to be a one or two modulo of three (MOD 3) to indicate the first packet format or the second packet format.

In Example 4, the subject matter of Example 2 can optionally include where the single user format and the multiple user format indicate at least a number of HE-SIG-B symbols.

In Example 5, the subject matter of Example 2 can optionally include where the indoor format and the outdoor format indicate a guard interval for a HE-SIG-B and a HE-long training field (LTF) symbol size.

In Example 6, the subject matter of Example 2 can optionally include where the single user format does not include a SIG-B.

In Example 7, the subject matter of any of Examples 1-6 can optionally include where the circuitry is to generate a duplicated L-SIG field with a polarity difference to indicate a third packet configuration of the HE packet or a fourth packet configuration of the HE packet.

In Example 8, the subject matter of Example 6 can optionally include where third packet configuration or the fourth packet configuration are one from the following group: a single user configuration or a multiple user configuration; and, an indoor configuration or an outdoor configuration.

In Example 9, the subject matter of any of Examples 1-8 can optionally include where the circuitry is configured to operate in accordance with orthogonal frequency division multiple access (OFDMA).

In Example 10, the subject matter of Example 9 can optionally include where the circuitry is configured to operate in accordance with Institute of Electronic and Electrical Engineers (IEEE) 802.11ax.

In Example 11, the subject matter of Example 9 can optionally include where the circuitry is further configured to transmit a trigger frame to the second HEW device, the trigger frame to include a duration and frequency allocation for the second HEW device for a transmit opportunity; and where the circuitry is configured to generate a second HE packet without the L-SIG field within the transmit opportunity.

In Example 12, the subject matter of any of Examples 1-11 can optionally include where the one or more HE signal fields comprises a HE-SIG-A, and wherein a modulation and coding scheme (MCS) field of the HE-SIG-A jointly signals one or more from the following group: a MCS and a low-density parity check (LDPC), and the MCS and a space-time block coding (STBC).

In Example 13, the subject matter of any of Examples 1-12 can optionally include where the circuitry further comprises processing circuitry and transceiver circuitry.

In Example 14, the subject matter of any of Examples 1-13 can optionally include where the one or more HE signal fields comprise at least one from the following group: a clear channel assessment (CCA) margin or densification and length ambiguity.

In Example 15, the subject matter of any of Examples 1-14 can optionally include memory coupled to the circuitry; and one or more antennas coupled to the circuitry.

Example 16 is a method to signal a packet configuration performed by a high-efficiency (HE) wireless local area network (WLAN) (HEW) device. The method including generating a HE packet comprising a legacy signal field (L-SIG) followed by one or more HE signal fields; configuring the L-SIG to signal to a second HEW device a packet configuration of the HE packet, wherein a length of the L-SIG modulo 3 is used to perform the signaling; and transmitting the HE packet to the HEW device.

In Example 17, the subject matter of Example 16 can optionally include where the first packet format or the second packet format of the HE packet is at least one from the following group: a single user format or a multiple user format; and, an indoor format or an outdoor format.

In Example 18, the subject matter of Example 16 can optionally include determining a polarity of a duplicated L-SIG field that is to indicate a third packet configuration of the HE packet or a fourth packet configuration of the HE packet, wherein third packet configuration or the fourth packet configuration are one from the following group: a single user configuration or a multiple user configuration; and, an indoor configuration or an outdoor configuration.

Example 19 is an apparatus of a high-efficiency (HE) station including circuitry configured to: receive a packet from a second HE station, the packet to include at least a legacy signal field (L-SIG); determine whether the L-SIG indicates that the packet is a HE packet; defer based on information in the L-SIG if the L-SIG indicates that the packet is not the HE-packet; and if the L-SIG indicates that the packet is the HE-packet, determine whether the packet is a first packet format of the HE packet or a second packet format of the HE packet, where a length of the L-SIG modulo 3 is used to signal the first packet format or the second packet format.

In Example 20, the subject matter of Example 19 can optionally include where the first packet format or the second packet format of the HE packet is at least one from the following group: a single user format or a multiple user format; and, an indoor format or an outdoor format.

In Example 21, the subject matter of Examples 19 and 20 can optionally include where the circuitry is to determine a polarity of a duplicated L-SIG field that is to indicate a third packet configuration of the HE packet or a fourth packet configuration of the HE packet.

In Example 22, the subject matter of Example 21 can optionally include where third packet configuration or the fourth packet configuration are one from the following group: a single user configuration or a multiple user configuration; and, an indoor configuration or an outdoor configuration.

In Example 23, the subject matter of any of Examples 19-22 can optionally include memory coupled to the circuitry; and, one or more antennas coupled to the circuitry.

Example 24 is a non-transitory computer-readable storage medium that stores instructions for execution by one or more processors of a high-efficiency (HE) wireless local-area network (WLAN) (HEW) master station, the operations to configure the one or more processors to cause the HEW master station to: generate a HE packet comprising a legacy signal field (L-SIG) followed by one or more HE signal fields; and configure the L-SIG to signal to a second HEW device either a first packet format of the HE packet or a second packet format of the HE packet, wherein a length of the L-SIG modulo 3 is used to signal the first packet format or the second packet format.

In Example 25, the subject matter of Example 24 can optionally include where the first packet format or the second packet format of the HE packet is at least one from the following group: a single user format or a multiple user format; and, an indoor format or an outdoor format.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless device, comprising circuitry configured to:
   generate a packet comprising a legacy signal field (L-SIG) followed by a repeated L-SIG, the repeated L-SIG to indicate that the packet is a HE packet, the repeated L-SIG followed by one or more HE signal fields;
   generate a length field of the L-SIG to signal to a second HE device either a first packet format of the HE packet or a second packet format of the HE packet, wherein a value of the length field of the L-SIG modulo 3 is used to signal the first packet format or the second packet format; and
   configure the HE wireless device to transmit the HE packet to the second HE device.

2. The apparatus of the HE device of claim 1, wherein the first packet format or the second packet format of the HE packet is at least one from the following group:
   a single user format or a multiple user format; and,
   an indoor format or an outdoor format.

3. The apparatus of the HE device of claim 2, wherein the circuitry is to configure the length field of the L-SIG to be a one modulo of three (MOD 3) to indicate the first packet format and a two MOD 3 to indicate the second packet format.

4. The apparatus of the HE device of claim 2, wherein the single user format and the multiple user format indicate at least a number of HE-SIG-B symbols.

5. The apparatus of the HE device of claim 2, wherein the indoor format and the outdoor format indicate a guard interval for a HE-SIG-B and a HE-long training field (LTF) symbol size.

6. The apparatus of the HE device of claim 2, wherein the single user format does not include a SIG-B.

7. The apparatus of the HE device of claim 6, wherein a third packet configuration or a fourth packet configuration are one from the following group:
   a single user configuration or a multiple user configuration; and,
   an indoor configuration or an outdoor configuration.

8. The apparatus of the HE device of claim 1, wherein the circuitry is configured to operate in accordance with orthogonal frequency division multiple access (OFDMA).

9. The apparatus of the HE device of claim 8, wherein the circuitry is configured to operate in accordance with Institute of Electronic and Electrical Engineers (IEEE) 802.11ax.

10. The apparatus of the HE device of claim 8, wherein the circuitry is further configured to transmit a trigger frame to the second HE device, the trigger frame to include a duration and frequency allocation for the second HE device for a transmit opportunity; and wherein the circuitry is configured to generate a second HE packet without the L-SIG field within the transmit opportunity.

11. The apparatus of the HE device of claim 1, wherein the one or more HE signal fields comprises a HE-SIG-A, and wherein a modulation and coding scheme (MCS) field of the HE-SIG-A jointly signals one or more from the following group:
   a MCS and a low-density parity check (LDPC), and the MCS and a space-time block coding (STBC).

12. The apparatus of the HE device of claim 1, wherein the circuitry further comprises processing circuitry and transceiver circuitry.

13. The apparatus of the HE device of claim 1, wherein the one or more HE signal fields comprise at least one from the following group:
   a clear channel assessment (CCA) margin or densification and length ambiguity.

14. The apparatus of the HE device of claim 1, further comprising memory coupled to the circuitry; and
   one or more antennas coupled to the circuitry.

15. A method to signal a packet configuration performed by a high-efficiency (HE) wireless device, the method comprising:
   generating a packet comprising a legacy signal field (L-SIG) followed by a repeated L-SIG, the repeated L-SIG to indicate that the packet is a HE packet, the repeated L-SIG followed by one or more HE signal fields;
   configuring a length field of the L-SIG to signal to a second HE device a packet configuration of the HE packet, wherein a length of the L-SIG modulo 3 is used to signal; and
   configuring the HE wireless device to transmit the HE packet to the HEW device.

16. The method of claim 15, wherein the first packet format or the second packet format of the HE packet is at least one from the following group:
   a single user format or a multiple user format; and,
   an indoor format or an outdoor format.

17. The method of claim 15, further comprising:
   determining a polarity of a duplicated L-SIG field that is to indicate a third packet configuration of the HE packet or a fourth packet configuration of the HE packet, wherein the third packet configuration or the fourth packet configuration are one from the following group:
   a single user configuration or a multiple user configuration; and
   an indoor configuration or an outdoor configuration.

18. An apparatus of a high-efficiency (HE) station comprising circuitry configured to:
   decode a packet from a second HE station, the packet to include at least a legacy signal field (L-SIG);
   determine the L-SIG followed by a repeated L-SIG indicates that the packet is a HE packet; and
   if the L-SIG indicates that the packet is the HE-packet, determine whether the packet is a first packet format of the HE packet or a second packet format of the HE packet, wherein a value of a length subfield of the L-SIG modulo 3 is used to signal the first packet format or the second packet format.

19. The apparatus of the HE station of claim 18, wherein the first packet format or the second packet format of the HE packet is at least one from the following group:
   a single user format or a multiple user format; and,
   an indoor format or an outdoor format.

20. The apparatus of the HE station of claim 18, wherein third packet configuration or the fourth packet configuration are one from the following group:
   a single user configuration or a multiple user configuration; and,
   an indoor configuration or an outdoor configuration.

21. The apparatus of the HE station of claim 18, further comprising memory coupled to the circuitry; and,
   one or more antennas coupled to the circuitry.

22. A non-transitory computer-readable storage medium that stores instructions for execution by one or more processors of an apparatus of a high-efficiency (HE) master station, the operations to configure the one or more processors to cause the apparatus of the HE master station to:
   generate a HE packet comprising a legacy signal field (L-SIG) followed by a repeated L-SIG, the repeated L-SIG to indicate that the HE packet is configured in accordance with Institute of Electrical and Electronic Engineers (IEEE) 802.11ax, the repeated L-SIG followed by one or more HE signal fields; and
   configure a length field of the L-SIG to signal to a second HE device either a first packet format of the HE packet or a second packet format of the HE packet, wherein a value of the length filed of the L-SIG modulo 3 is used to signal the first packet format or the second packet format.

23. The non-transitory computer-readable storage medium of claim 22, wherein the first packet format or the second packet format of the HE packet is at least one from the following group:
   a single user format or a multiple user format; and,
   an indoor format or an outdoor format.

* * * * *